United States Patent [19]

Enos, Jr.

[11] 4,090,328

[45] May 23, 1978

[54] METHOD AND APPARATUS FOR TREATING TREES

[75] Inventor: Herman Isaac Enos, Jr., Chadds Ford, Pa.

[73] Assignee: Hercules Incorporated, Wilmington, Del.

[21] Appl. No.: 793,697

[22] Filed: May 4, 1977

[51] Int. Cl.² .................. A01G 23/10; A01G 29/00
[52] U.S. Cl. ............................................. 47/12; 47/57.5
[58] Field of Search ..................................... 47/10–12, 47/57.5; 21/73; 144/34 A

[56] References Cited

U.S. PATENT DOCUMENTS

| | | | |
|---|---|---|---|
| 2,803,924 | 8/1957 | Little | 47/57.5 |
| 2,853,833 | 9/1958 | Hash | 47/57.5 |
| 2,927,401 | 3/1960 | Little | 47/57.5 |
| 3,946,775 | 3/1976 | Albright | 144/34 A |

FOREIGN PATENT DOCUMENTS 169,733  5/1951  Austria .................................. 47/12

Primary Examiner—Robert E. Bagwill
Attorney, Agent, or Firm—Joshua W. Martin, III

[57] ABSTRACT

Method and apparatus for treating trees includes at least one cutting element having a fluid passageway therethrough, facilities for positioning the cutting element around the periphery of a tree, and facilities for driving said cutting element through the bark of a tree to expose the sapwood therein and for ejecting a predetermined quantity of fluid through the passageway in the cutting element onto the sapwood of a tree. In addition, the invention includes a method for the chemical treatment of trees.

16 Claims, 8 Drawing Figures

METHOD AND APPARATUS FOR TREATING TREES

BACKGROUND OF THE INVENTION

1. Field of the Invention

This invention relates to method and apparatus for treating trees by injecting a chemical solution into frills circumferentially spaced around a tree. This invention relates particularly to method and apparatus for chemically inducing the formation of lightwood, rich in oleoresin content, in growing pine trees.

2. Description of the Prior Art

It is known to chemically induce deposition of oleoresin in a living conifer such as, for example, a slash pine by preparing a treatment site on the hole thereof and subsequently applying thereto an aqueous solution of a treating chemical such as a substituted bipyridylium salt. The oleoresins are extracted after the trees are harvested and the naval stores products are produced from the extract. See U.S. Pat. No. 3,839,823 of Oct. 8, 1974, reference to which is hereby made.

Sapwood of a conifer has long vertical cells, called tracheids, in which sap moves up the bole. These vertical cells are crossed at right angles by ray cells. Ray cells are shorter than vertical cells and are used for conveying food across the conifer to where it is needed. Treatment sites are prepared so that when a solution of treating chemical is applied, it will make contact with both the vertical cells and with the ray cells.

Heretofore, treatment sites have been prepared by removing a small section of bark to expose sapwood; or by making an axe cut deep enough to expose sapwood; or by boring a small downwardly sloping hole into the sapwood. Application of solution of treating chemical to the above treatment sites is made by any convenient means, such, for example, as by use of a sprayer or a brush. With regard to the treatment site prepared by boring a downwardly sloping hole into the sapwood, the solution is applied by pouring it into the hole.

Another method of treatment site preparation involves providing on the sapwood of a living conifer anywhere from ground level to a height of about 10 ft. above ground level at least one elongated, downwardly sloping hole and subsequently inserting into the hole an absorbent fibrous material for receipt of a treating chemical. The treating chemical will usually be applied in the form of a solution thereof in a suitable solvent, water preferably. The absorbent fibrous material functions as a wick and provides for movement of the solution of treating chemical into the conifer. If desired, the treating chemical, alone or in solution, can be applied to the absorbent fibrous material prior to insertion of the fibrous material into the prepared hole. This method of treatment site preparation is disclosed in U.S. Pat. No. 3,971,159 of July 27, 1976, reference to which is hereby made.

Numerous blades are disclosed in the prior art for wounding trees. A blade is disclosed in U.S. Pat. No. 2,927,401 which has a convex-concave cross-section, a fantail-shaped cutting edge, i.e., convex, and provisions for ejectment of liquid from the concave surface in treating trees. The narrow frill made by this blade, causes some of the treating liquid to flow out of the frill and onto the bark of the tree, that portion flowing out of the frill thereby not contacting the sapwood to provide beneficial treatment. This narrow frill is made because the fantail-shaped cutting edge, in operation, slides down between the inner and outer bark and the inner tree, making a narrow wound which is deeper in the center. The narrow frill, combined with overflow of the treating solution down the bar, lowers the efficiency of any treatment program.

SUMMARY OF THE INVENTION

This invention relates to apparatus and method for injecting a chemical solution into downwardly sloping frills, circumferentially spaced around a tree and extending through the outer and inner bark thereof, wherein a cutting element cuts the frill and injects solution onto the upper surface of the frill along the xylem of the tree. A frill is a very shallow cut or groove extending through the outer and inner bark layers into approximately one or two of the annual growth rings constituting the outer xylem, made by folding back a thin strip of bark. Substantially simultaneous application of the solution during the cutting of a frill is required to insure that the ducts which convey water and other substances through the tree in an axial direction do not close. In addition, it is desirable to have a wide cut of relatively narrow depth to insure contact with as much of the xylem as possible, while preventing waste of the chemical solution down the bark. The cutting element, which is used to make the wound, must insure that the proper type of cut is made.

Preferably, the cutting element is a blade which has a concave cutting edge to substantially conform to the periphery of a tree, and is designed to have liquid ejected from the flat, i.e., non-beveled, surface only. In operation, the non-beveled surface, which contains the concavity for ejectment of liquid, is uppermost, assuring that initial contact of the treating solution is along the upper surface of the frill. In addition, after impact with the tree, the novel blade of this invention moves down slightly to open up the frill and maximize contact of the treating solution with the sapwood. A plurality of these blades can be mounted so that a significant percentage of the circumference of a tree can be treated with the chemical simultaneously with formation of the frill.

In the treatment of large numbers of trees, blade design and treating method are critical elements in a cost-effective program requiring substantial migration of a chemical through a living tree. The cutting blade is one of the most critical elements in such a program. How the blade is designed, contoured and operated determines how much solution reaches the sapwood. Experience has shown that even a slight deviation in any facet of the blade's surface, even involving a fraction of an inch or so, can make the difference between success and failure in expeditiously forming the ever important frill in the trunk of a tree. Combining effective blade design with optimizing the treatment contact area by cutting frills around a substantial portion of the periphery of a tree increases significantly the efficiency of a tree treatment program.

In growing pine trees, the application of a treating chemical can induce lightwood formation, the deposition of naval stores products within the tree. Oleoresins which are produced in the lightwood formation are extracted after the trees are harvested and the naval stores products are produced from the extract.

The method and apparatus of this invention will provide substantial improvement over present inefficient manual application techniques. For example, a larger number of trees can be treated in a given period of time than would be possible with a method of tree treatment utilizing a hand-held axe. Also, this method and apparatus provide more controlled power for uniform treatment and substantial contact of the treating liquid with the sapwood of a tree. Any variation in treatment due to treatment site location, depth of cut, amount of liquid ejected, character of cut due to operator fatigue, etc., are significantly minimized with the method and apparatus of this invention. Further, since an operator can be enclosed in a cab of the mobile treatment apparatus of this invention, trees can be treated under adverse weather conditions, that would make manual application techniques inadvisable at best.

In accordance with this invention, apparatus is provided for injecting liquid into a tree including at least one, but preferably a plurality of cutting elements each having a fluid passageway therethrough, facilities for positioning said cutting elements around the periphery of a tree; and facilities for driving said cutting elements through the bark of a tree to expose the sapwood therein and for ejecting a predetermined quantity of fluid through said passageway in each cutting element onto the sapwood of a tree. In addition, the invention includes a method for the chemical treatment of trees.

The drawings which follow further illustrate this invention and in the drawings, like numbers refer to like parts where applicable.

DESCRIPTION OF THE INVENTION

Figure 1:
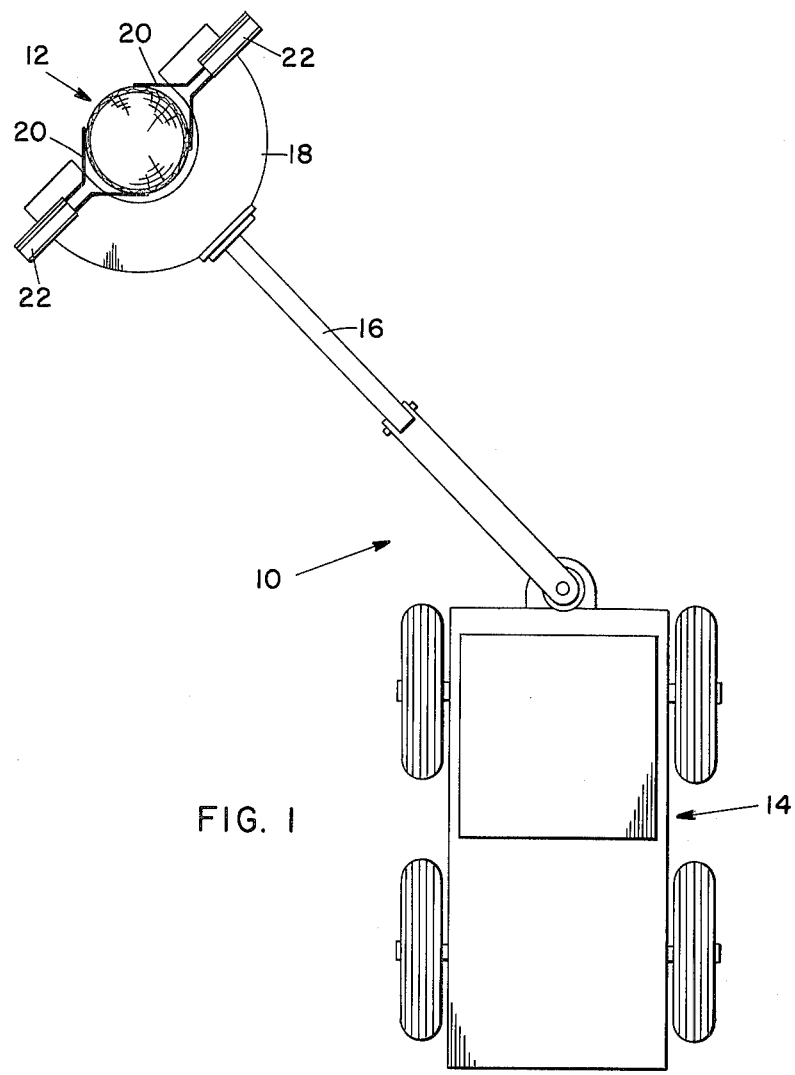
FIG. 1 is a top plan view of an apparatus employing the subject matter of this invention.
Figure 2:
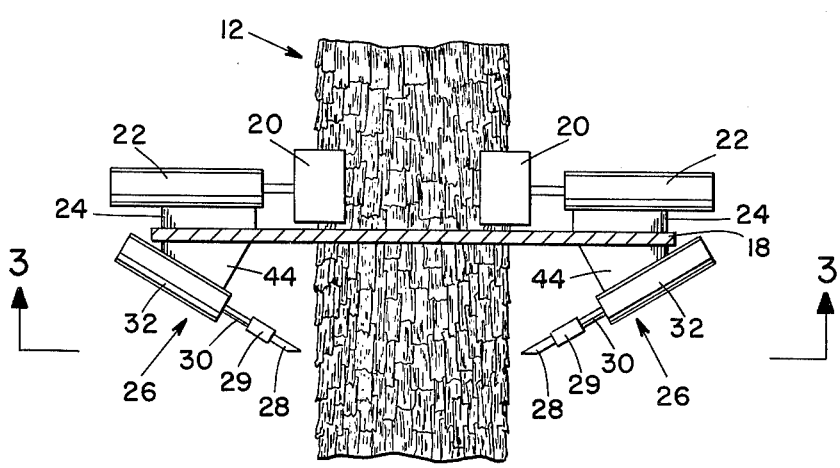
FIG. 2 is a side elevational view of a portion of the apparatus of FIG. 1 in position around a tree trunk.

Referring now to the drawings, as shown in FIG. 1, a preferred embodiment of the tree injection apparatus 10 of this invention is shown positioned around a tree 12, for application of a chemical treating solution. The tree injection apparatus includes a mobile unit 14 which may be an all-terrain skid-ester vehicle. The mobile unit moves to a position adjacent to the trunk of tree 12. An hydraulic knuckle boom 16 is mounted on the front of mobile unit 14 and is adapted to swing in a horizontal and vertical plane. Alternately, a straight boom, adapted to only swing in a substantially horizontal plane could be substituted for knuckle boom 16. In the embodiment of FIG. 1, a semicircular mounting plate 18 is attached to the front end of hydraulic boom 16. A pair of V-shaped tree centering clamps 20 are pivotally mounted onto mounting plate 18. Centering clamps 20 are attached to centering clamp cylinders 22 which are positioned on mounting plate 18 by clamp mounts 24, as shown in FIG. 2.

Figure 3:
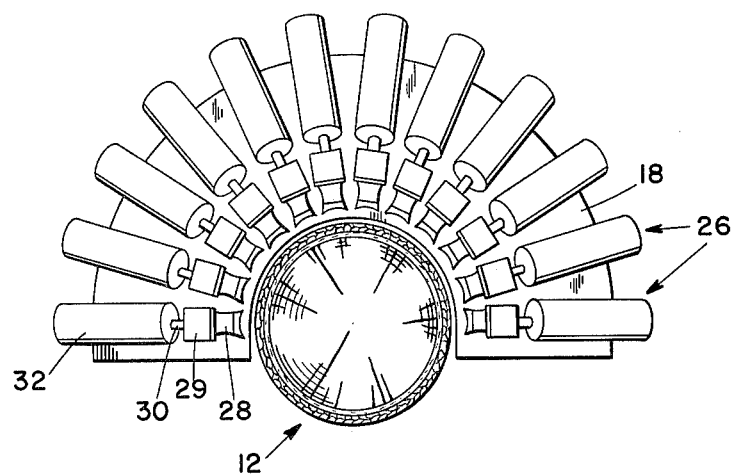
FIG. 3 is a view of the apparatus shown in FIG. 2 taken along the line 3—3 of FIG. 2.

In this embodiment, a plurality of injector assemblies 26 is mounted to plate 18 around the periphery of tree 12 as shown in FIG. 3. Each injector assembly 26 consists of a cutting element 28, sometimes hereinafter referred to as injector blade 28, blade base 29, tubular support member 30 and injector cylinder 32.

Figure 4:
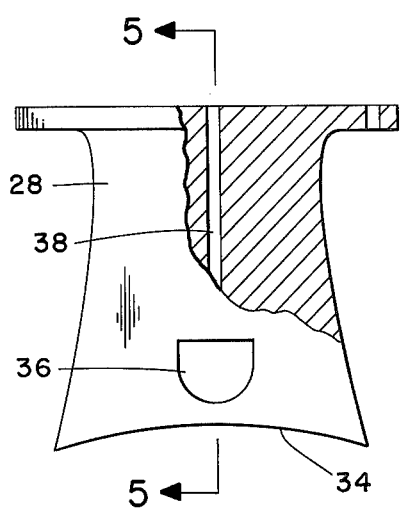
FIG. 4 is an elevational view in partial section of the injector blade.
Figure 5:
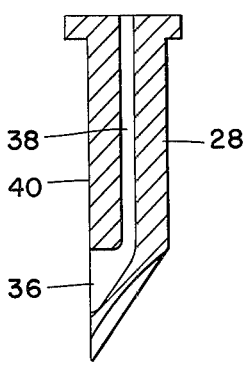
FIG. 5 is a section of the injector blade of FIG. 4 taken along line 5—5.

A preferred embodiment of blade 28 is shown in FIG. 4. Blade 28 has a single bevel concave edge 34, adapted to substantially conform to a portion of the periphery of a tree trunk. Each blade 28 contains an annular passageway 38 therethrough, which opens into cavity 36. As shown in FIG. 5, cavity 36 opens onto the flat surface 40 of blade 28.

The mechanism for moving the treating liquid from a fluid reservoir (not shown) through annular passageway 38 can be any known pump system which could be actuated by impact of the injector blade with a tree or activated after impact by an operator. For example, the treating fluid could be drawn into passageway 38 by a spring-loaded piston system or a pressure actuated inertial pump which ejects a preset amount of fluid substantially simultaneously with the moment of impact. Such an inertially actuated pump would work on the principle of the well known lift pump. An inertially actuated pump mechanism is available from the TSI Company of Flanders, New Jersey, and used in the Hypo-Hatchet ® tree injector apparatus. Alternately, with a slower hydraulic or pneumatic drive mechanism for injector cylinder 32, a different delivery system might be required, such as a chamber and rotating valve mechanism activated by air pressure. The inner volume of the rotatable valve chamber would equal the amount of treating liquid desired. The valving could be designed so that immediately after impact of injector blade 28 with a tree, the valve containing the liquid could be rotated into passageway 38 while simultaneously a channel would be opened to allow the compressed gas to eject the liquid through passageway 38 toward cavity 36 of injector blade 28. The position of the fluid reservoir for the treating liquid is not critical. A single reservoir or multiple reservoirs for each injector assembly 26 could be attached to mounting plate 18 in proximity to the assemblies 26, or a single reservoir could be placed on mobile vehicle 14 and connected to each assembly 26 by a suitable hose and pump system.

For treatment of trees with this preferred embodiment of the invention, mobile unit 14 is moved near the subject tree. Using hydraulic knuckle boom 16, mounting plate 18 is placed in position around the periphery of the subject tree. Tree clamps 20, actuated by centering clamp cylinders 22, are brought into contact with the outer surface of tree 12. Tree clamps 20 center mounting plate 18 around the vertical axis of the tree. In this preferred embodiment, centering clamp cylinders 22 are actuated by hydraulic means, but may be activated by mechanical, hydraulic or pneumatic sources.

Once mounting plate 18 is in position, the plurality of injector assemblies 26 are in position around the tree. Positioning mounts 44 determine the angle of impact for each injector blade 28. Preferably, injector cylinder 32 is used to withdraw injector blade into a spring loaded position adjacent tree 12.

Figure 6:
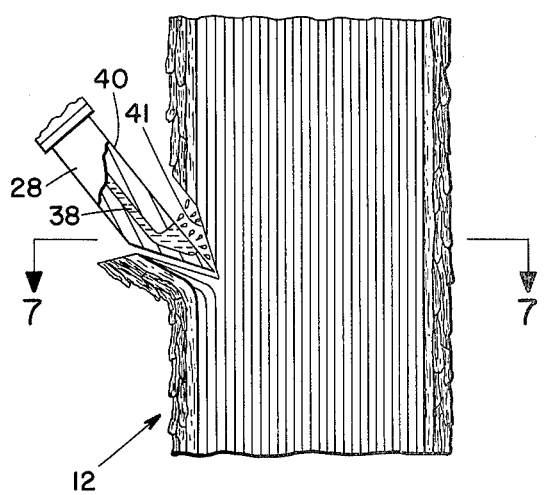
FIG. 6 is a view of the injector blade, showing the approximate manner in which the cutting edge forms a downwardly sloping frill for deposition of the treating liquid.

In the preferred method of this invention, it is desirable to treat approximately 50% of the circumference of a tree. Therefore, injector assemblies 26 can be spaced around the circumference of the tree so that the total length of cuts made by injector blades 28 will correspond to 50% of the circumference. By altering the number and positions of injector assemblies 26, various other percentages of the circumference of the tree can be treated. In this embodiment, each injector blade 28 must be driven into the tree with a sharp blow in order to make a proper frill and to deliver the chemical treating solution as shown in FIG. 6. The force of each blow made by injector assembly 26 can be adjusted to correspond to the bark thickness or resistance to impact of any particular group of trees, so that the blade will penetrate the bark. Preferably, the frills are made around the periphery of the trees in a plane substantially normal to the vertical axis of the tree.

It is desirable in the method of this invention to treat approximately 50% of the circumference of the tree by cutting a frill through the outer bark and the inner bark (phloem) but not substantially into the sapwood, as shown in FIG. 6.

Figure 7:
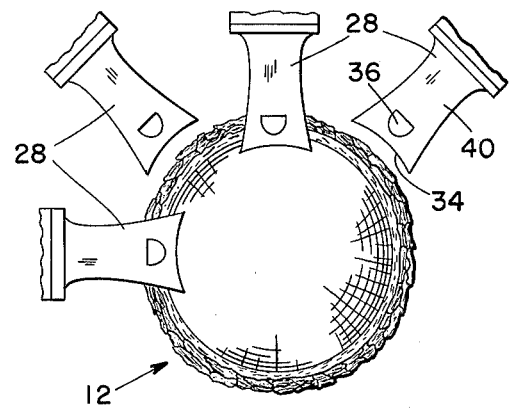
FIG. 7 is a section taken along the 7—7 of FIG. 6 showing a plurality of injector blades, disposed for alternate impact with a tree, to form a frill around approximately 50% of the circumference of the tree.

The injector assemblies 26 can be adjusted so that a continuous frill can be cut around a portion of the circumference of the tree, e.g., 50% of the circumference, or the assemblies 26 can be offset to make a discontinuous frill wherein alternating injector blades 28 are displaced above or below other adjacent injector blades 28. In addition, the injector assemblies 26 can be adjusted so that adjacent blades impact in an alternating sequence to form a continuous frill within a single plane as shown in FIG. 7.

Each injector blade 28 has a concave blade edge 34, which is designed to substantially conform to the average circumference of a particular group of trees. Concave blade edge 34 will open a wide shallow frill of even depth and in turn allow delivery of a uniform volume of chemical treating solution into the frill. The amount of treating solution delivered to the frill is controlled by the pump system which moves the solution from a reservoir to each injector blade 28.

Immediately after impact of injector blade 28 with the tree, the chemical treating solution flows out of cavity 36, which is located on blade first surface 40, upward and onto the upper surface 41 of the exposed sapwood of the tree as shown in FIG. 6.

Figure 8:
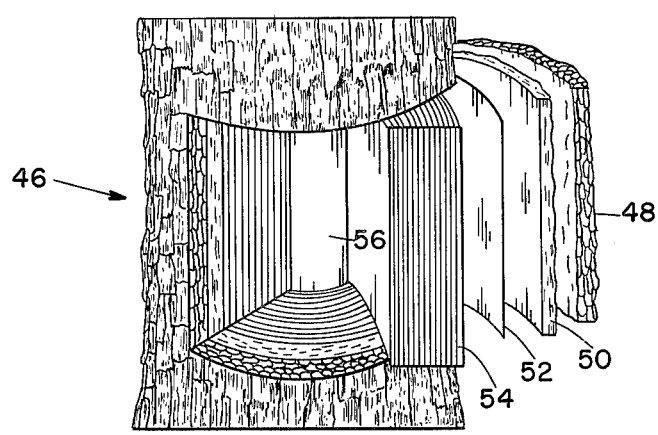
FIG. 8 shows the layers of a conifer to be treated.

Referring now to FIG. 8 of the drawings, there is shown four distinct layers of a living conifer 46. Outer bark 48 insulates the conifer from extreme heat and cold, helps to keep out rain, and protects the conifer against insects. Phloem 50 conducts food from leaves (needles of a conifer are leaves) to the rest of a conifer. Cambium layer 52 produces new bark and new wood annually in response to hormones that stimulate the growth of cells. Sapwood 54 is a pipeline for water moving from roots to the leaves. When its inner cells lose their vitality, they turn into heartwood. Heartwood 56 is the central supporting column of a mature conifer. Although it is dead, it will not decay or lose strength as long as the outer layers of a conifer remain intact.

While heartwood is present in mature conifers, the preferred conifers for treatment in accordance with this invention are of an age of maturity such that there is very little, if any, heartwood present. Thus, the interior portion of a conifer adjacent the cambium layer will consist essentially of sapwood.

Therefore, it is desirable to induce lightwood formation within the sapwood of growing conifers as a result of applying an aqueous chemical solution to the sapwood thereof. Lightwood, which is induced by the chemical treatment is rich in oleoresin. Chemicals used to induce oleoresin deposition are a class of substituted bipyridylium salts (see U.S. Pat. No. 3,839,823). Examples of such treating chemicals are

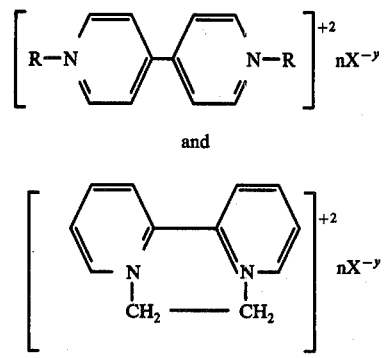

and where $n = 1$ or 2, $y = 1$ or 2, and $n \times y = 2$ and $R = CH_3—, CH_3CH_2—, CH_3CH_2CH_2—,$

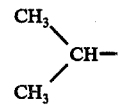

and higher aliphatic alkyl groups, either straight chain or branched and X is any anion that makes the compound water-soluble, such as, but not limited to, the following:

| | |
|---|---|
| $Cl^-$ | (chloride) |
| $Br^-$ | (bromide) |
| $F^-$ | (fluoride) |
| $I^-$ | (iodide) |
| $SO_4^-$ | (sulfate) |
| $NO_3^-$ | (nitrate) |
| $OH^-$ | (hydroxyl) |
| $CH_3SO_4^-$ | (methyl sulfate) |

The aqueous solution of treating chemical is absorbed into the ray cells and the vertical cells, resulting in the production of oleoresin.

Preferably, the solution is made by dissolving a predetermined amount of a treating chemical in water. Since some of the chemicals are commercially available as aqueous solutions, the only preparation may involve further dilution by the addition of water.

Once applied in the form of an aqueous solution, the chemical is mobile and may be carried upward in the sap of the transpiration stream within the living conifer. The chemical continues to induce oleoresin production wherever it is located.

The following example is illustrative of the use of this invention.

EXAMPLE 1

Groups of conifers were treated at two locations in the United States using a method of this invention. The conifers included P. elliottii at a typical site in Mississippi, and P. taeda at a typical site in Louisiana. Groups of ten conifers were treated with 0.25, 0.35, 0.50. 0.75 and 1.0 percent treating solution, respectively, on 50% of the circumference of each tree. Two other groups of 100 trees each were treated with a 0.25% and 1.0% treating solution, also on 50% of the circumference. Two equal length cuts, equal to one-fourth of the circumference, were placed back to back on each tree at 15 inches above the ground. These cuts were made using a series of hand blows with a single blade wherein the blade had a concave cutting edge with the ejectment cavity in the flat, non-beveled upper surface. In 8 to 9 inch diameter trees, 8 to 10 cuts were necessary to form the frills constituting 50% of the circumference of the trees. The injector blade delivered, on the average, approximately 2 ml. of treating solution per stroke. Qualitative examination of the cross-sections cut from these trees after one season's development shows positive response at all levels of treating solution.

In July of 1976, a 4 foot bolt was cut from five of the trees treated with 1% treating solution. The average resin content of the four foot bolts was 9.5%.

In October of 1976, 4 foot bolts were cut from another group of five trees which had also been treated with 1% treating solution. The average resin yield of these trees was 10.0%.

From the group of 100 trees treated with 1.0% treating solution, 5 foot bolts cut from 43 trees in October of 1976 produced an average of 7.2% resin and 1.8% turpentine. Five foot bolts cut in October of 1976 from trees that were not treated, i.e., control trees, produced an average yield of 1.5% resin and 0.2% turpentine.

While the above description has been directed to the use of apparatus and method of this invention, for application of specific treating chemicals that will induce oleoresin deposition in a conifer, it is to be understood that the apparatus and method can be used for application of other treating chemicals that will induce oleoresin deposition. Also, the invention can be used, if desired, for the application to conifers of other treating chemicals such, for example, as systemic insecticides or fungicides.

Although a blade having a concave cutting edge and a flat non-beveled surface containing a cavity is disclosed as the cutting element for the apparatus of this invention, other types of cutting elements are also applicable. Any cutting element that can penetrate the bark of a tree to form a frill while also exposing the sapwood thereof, and eject a predetermined quantity of tree treating solution through a passageway within the element onto the exposed sapwood could be used.

Although the treating substance is described herein as a liquid, it could be any fluent material for the treatment of trees, including substances having a higher viscosity than water, such as foams, gels, slurries or particulate suspensions.

The mobile treating apparatus of this invention has a decided safety advantage over hand-held tree treating implements in that the remoteness of the operator minimizes any potential injury due to flying debris or liquid spatter from the cutting and injection process.

It is to be understood that the above description and drawings are illustrative of this invention and not in limitation thereof. As will be evident to those skilled in the art, various modifications can be made in the light of the foregoing disclosure and discussion, without departing from the spirit or scope of the disclosure or from the scope of the claims.

What I claim and desire to protect by Letters Patent is:

1. Apparatus for injecting liquid into a tree comprising:
    a plurality of cutting elements having fluid passageways therethrough;
    means, in communication with said passageways, for supplying a liquid;
    means for positioning said cutting elements around the periphery of a tree;
    means for driving certain of said cutting elements through the bark of the tree substantially simultaneously to expose the sapwood thereof and for ejecting a predetermined quantity of liquid through said passageways in said cutting element onto the sapwood.

2. The apparatus of claim 1, wherein said mans for positioning said cutting element includes at least one member which engages the trunk of said tree.

3. The apparatus of claim 2, wherein said engaging member is a clamp, pivotally mounted on a mounting plate, and actuated by means for forcing said clamp against said tree to position said cutting element.

4. The apparatus of claim 3 wherein means for driving said cutting elements and ejecting a predetermined amount of liquid includes means for withdrawing said cutting elements and wherein said cutting elements are mounted on a plate which extends around at least a portion of the trunk of said tree.

5. The apparatus of claim 4, wherein said plate is substantially semi-circular, having a semi-circular opening therein for positioning around the trunk of said tree, having a plurality of said cutting elements mounted thereon with said blade of each of said cutting elements disposed toward the trunk of said tree.

6. The apparatus of claim 5 including: mobile means for moving said apparatus from tree to tree, wherein said mobile means includes a vehicle having rotatably attached thereto an hydraulic boom for adjustment of the position of said cutting elements; and means for adjusting the force of said driving means.

7. The apparatus of claim 1 wherein means for driving said cutting elements and ejecting a predetermined quantity of liquid includes means for withdrawing said cutting element.

8. The apparatus of claim 1 wherein a plurality of cutting elements is mounted on a plate which extends around at least a portion of the trunk of said tree.

9. The apparatus of claim 1, including means for alternately activating adjacent cutting elements to form a continuous frill.

10. The apparatus of claim 1, including mobile means for moving said apparatus from tree to tree and for adjusting the position of said apparatus in relation to the size and position of the trunk of said trees.

11. The apparatus of claim 10 wherein said mobile means includes a vehicle having rotatably attached thereto an hydraulic boom for adjustment of the position of said cutting elements.

12. The apparatus of claim 1 wherein said driving and ejecting means includes means for adjusting the force of said driving means.

13. A method of applying a treating chemical to a growing tree comprising:
    positioning an apparatus having a plurality of cutting elements around a tree, each of said cutting elements having a fluid passageway therethrough, wherein said apparatus includes
    means for positioning said cutting elements around said tree,
    means for driving certain of said cutting elements through the bark of said tree substantially to expose the sapwood simultaneously thereof and for ejecting a predetermined quantity of liquid through said passageways in each of said cutting elements onto the sapwood;

opening frills along the surface of said tree with said cutting elements; and substantially simultaneously injecting said liquid onto the upper surface of said frills.

14. The method of claim 13 wherein the injected liquid is an aqueous solution of substituted bipyridylium salt.

15. The method of claim 13 wherein the frills made along the surface of the tree are made around the periphery of said tree, in a plane substantially normal to the vertical axis of said tree.

16. The method of claim 15 wherein the circumferential frills made along the surface of the tree constitute approximately 50% of the circumference thereof.

* * * * *

UNITED STATES PATENT AND TRADEMARK OFFICE
CERTIFICATE OF CORRECTION

PATENT NO. : 4,090,328
DATED : May 23, 1978
INVENTOR(S) : Herman I. Enos, Jr.

It is certified that error appears in the above-identified patent and that said Letters Patent are hereby corrected as shown below:

Col. 1, line 16 " hole " should read -- bole --.

Col. 3, line 16 " facilitates " should read -- facilities --.

Col. 3, line 55 " skid-ester" should read -- skid-steer --.

In the Claims, Col. 8, Claim 2, line 9 " mans " should read -- means --.

Col. 8, Claim 13, line 64 after " substantially " insert -- simultaneously --.

Col. 8, Claim 13, line 65 delete " simultaneously ".

Signed and Sealed this

Nineteenth Day of September 1978

[SEAL]

Attest:

RUTH C. MASON
Attesting Officer

DONALD W. BANNER
Commissioner of Patents and Trademarks